INVENTOR.
ROBERT A. NIEMANN

INVENTOR.
ROBERT A. NIEMANN

United States Patent Office 3,397,321
Patented Aug. 13, 1968

3,397,321
POWER CONTROL APPARATUS
Robert A. Niemann, Roanoke, Va., assignor to General Electric Company, a corporation of New York
Filed Apr. 22, 1965, Ser. No. 450,131
3 Claims. (Cl. 307—31)

ABSTRACT OF THE DISCLOSURE

In an electrical power system, pulses indicating the ideal rate of power use are added and pulses indicating the actual rate of power use are subtracted in a counter. The difference continuously indicates whether power use should be decreased or may be increased without exceeding a demand limit. When the maximum possible power use offset by the demand limit exceeds the actual power use, the power use need not subsequently be decreased during that demand period.

---

This invention is directed to a power demand system and more particularly to a power demand system for limiting the power consumed over a measured demand interval to a predetermined maximum demand level.

Large power users normally have a contractual agreement with their electric utility to estabilsh the maximum power usage or demand over a specified time interval. This time interval is normally called the demand period and may be 15, 30 or 60 minutes in duration. The power user then pays a fixed charge to the electric utility for the available power, even if all of the available power is not used. The utility must invest capital to have this power available, so it must charge the power user for this available power.

If the power user exceeds this fixed demand limit in any demand period, he pays a demand penalty charge for the current month and establishes a new demand limit with a higher fixed charge for the next twelve or more months.

For the most efficient use of power the industrial customer should try to use the contracted demand amount in each demand period without ever exceeding the demand limit during any demand period. This is difficult to do as plant power use normally varies, so that the industrial consumer must be prepared to adjust the plant load to provide for manual or automatic control of the adjustable portion of the plant load. There are two well-known ways of controlling or reducing the effective value of load. One way is to control the load itself and the other way is to control an auxiliary source of current supply for assuming a part of the load. Both of these ways produce the same net result on the main power circuit in that the effective load value is reduced. Furthermore there are a great many equivalent ways of reducing the value of the load itself. Thus, in the case of loads like electrode furnaces, the load may be controlled in infinitely small increments by electrode control, whereas in the case of loads comprising a plurality of parallel connected load devices, such as electric motors, the load may be controlled by disconnecting one or more of the motors entirely from the circuit; so that in this case the load is controlled in positive increments of appreciable value.

It is therefore an object of this invention to provide a new and improved power demand system.

Another object of this invention is to provide a new and improved power demand system for limiting the power usage to a predetermined level over a demand interval.

It is another object of this invention to provide a new and improved power demand system for limiting power usage to a predetermined level over a demand interval by controlling the effective value of the load on the power system.

Another object of this invention is to provide a new and improved power demand system for inhibiting the control of the load when the power use drops to a pre determined level.

The invention is set forth with particularity in the appended claims. The principles and characteristics of the invention, as well as other objects and advantages are revealed and discussed through the medium of the illustrative embodiments appearing in the specification and drawings which follow.

Figure 1:
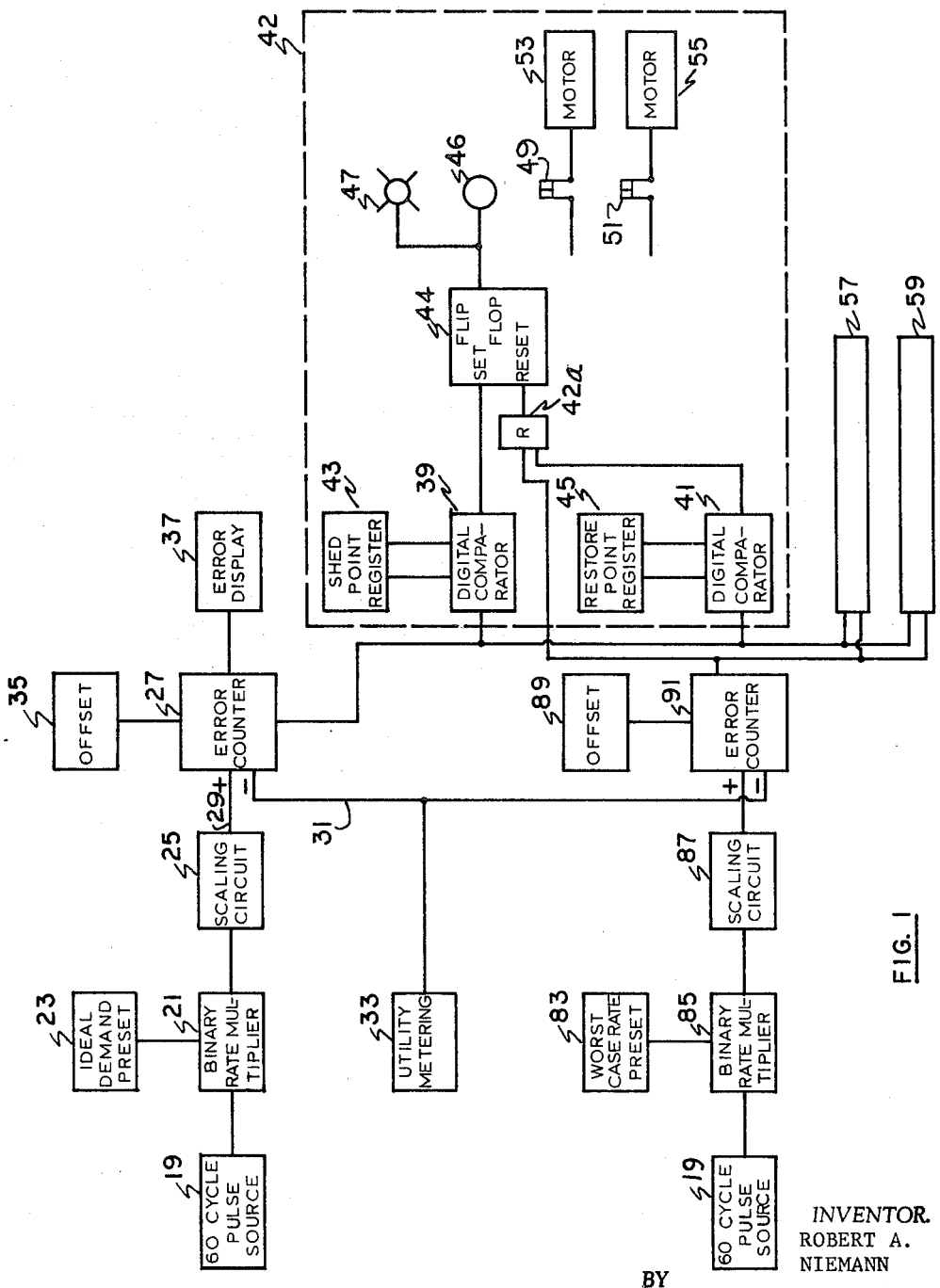
FIGURE 1 is a block diagram of a power demand system constructed according to this invention.

Referring now to FIGURE 1 for a description of the demand control system according to this invention, the 60 cycle pulse source 19 produces 60 pulses per second based upon the 60 cycle source. In this manner the 60 cycle pulse source 19 produces 108,000 60 cycle pulses during a 30 minute demand interval. The pulses from pulse source 19 are applied to binary rate multiplier 21. Binary rate multiplier 21 will pass from .1 to 99.9 percent of the pulses applied thereto depending upon the setting in an ideal demand preset circuit 23 which may be thumbwheel switches. Thus, for example, if the ideal demand preset circuit 23 were set to pass 50 percent of the pulses received by the binary rate multiplier 21 during a 30 minute demand interval 54,000 of the 108,000 60 cycle pulses received during that time interval would be passed by the binary rate multiplier 21 and applied to the scaling circuit 25. Binary rate multipliers such as binary rate multiplier 21 are well known in the art. Scaling circuits such as scaling circuit 25 are well known in the art, and scale pulses received down by a predetermined factor. For instance using a scaling factor of 108, the scaling circuit 25 would scale down 108,000 pulses to 1,000 evenly spaced pulses Thus, with the combination of the binary rate multiplier 21 and the scaling circuit 25, the output of the scaling circuit 25 is a plurality of evenly spaced pulses representing the value set in the ideal demand preset circuit 23.

The output of scaling circuit 25 is applied to the plus input 29 of error counter 27. Error counter 27 counts the pulses received from scaling circuit 25. Utility metering pickup 33 produces pulses indicating the amount of power being used. Utility metering device 33 meters the power usage in the normal manner and produces pulses during the demand period indicating that power usage The utility metering device 33 applies these pulses to the minus input terminal 31 of error counter 27.

Error counter 27 is a counter which will add the pulses received on input terminal 29 and subtract the pulses received on input terminal 31. Error counter 27 therefore contains a count indicating the number of pulses received on input terminal 29 minus the number of pulses received on input terminal 31. Offset circuit 35 applies a predetermined number of pulses to the error counter 27 at the start of each demand period. This provides a positive offset to prevent a false alarm in the early portion of the demand period in a manner to be described later. The contents of the error counter 27 are indicated in the error display 37. The contents of the error counter 27 are also applied to digital comparator 39 and digital comparator 41 of control unit 42. The contents of the error counter 27 are continually compared in digital comparator 39 with the contents of shed point register 43 and also compared in digital comparator 41 with the contents of the restore point register 45. Digital comparator 39 applies a pulse to the set input terminal of flip flop 44 to set flip flop 44 to one when the digital omparator 39 indicates that the contents of shed point egister 43 and error counter 27 are equal. Digital comparator 41 applies a pulse to the reset input terminal of lip flop 44 to reset that flip flop to zero when digital omparator 41 indicates equality between the contents of estore point register 45 and error counter 27. Flip flop 4 when set to one produces a signal to energize relay oil 46 and lamp 47. Relay coil 46 when energized will pen normally closed contacts 49 and 51. Normally losed contracts 49 are connected to a motor 53 and ormally closed contacts 51 are connected to a motor 5. In this manner when normally closed contacts 49 and 1 are open, motors 53 and 55 will be de-energized. rror counter 27 may be connected to other shed and estore control components 57 and 59 to shed or disonnect other power using components such as other notors or electrode furnaces at other points of comparison etween the error counter 27 and the other shed points.

The 60 cycle pulse source 19 applied pulses at the ate of 60 pulses a second to the binary rate multiplier 5. Binary rate multiplier 85 passes from .1 to 99.9 ercent of the pulses applied thereto depending upon the etting in the thumbwheel switches in a worst case rate reset circuit 83 in the same manner described for binary ate multiplier 21. The pulses from binary rate multiplier 5 are applied to scaling circuit 87 where the pulses eceived are scaled down. In the same manner as scaling ircuit 25 the scaling circuit 87 may use a scaling factor f 108. Thus, the combination of the binary rate multilier 85 and the scaling circuit 87 produces a plurality f evenly spaced pulses representing the value set in the orst case rate preset thumbwheel switches 83.

The output of scaling circuit 87 is applied to the plus nput terminal of error counter 91. The pulses from the tility metering device 33 are applied to the minus input rminal of error counter 91. Error counter 91 adds he actual demand pulses received on the positive input terminal from the utility metering 33 and subtracts he worst case demand pulses received on the negative nput terminal from the scaling circuit 87 so that the contents of the error counter at any one time are the difference between the worst case demand pulses and the actual emand pulses. Offset circuit 89 applies an offset to he error counter 91 by setting the error counter to a egative number at the beginning of each demand period.

When the error counter 91 goes positive, the error ounter 91 applies a signal to OR circuit 42a to rest flip op 44. Error counter 91 goes positive when the number f worst case demand pulses added in error counter 91 xceeds the actual demand pulses subtracted, plus the nitial offset.

Figure 2:
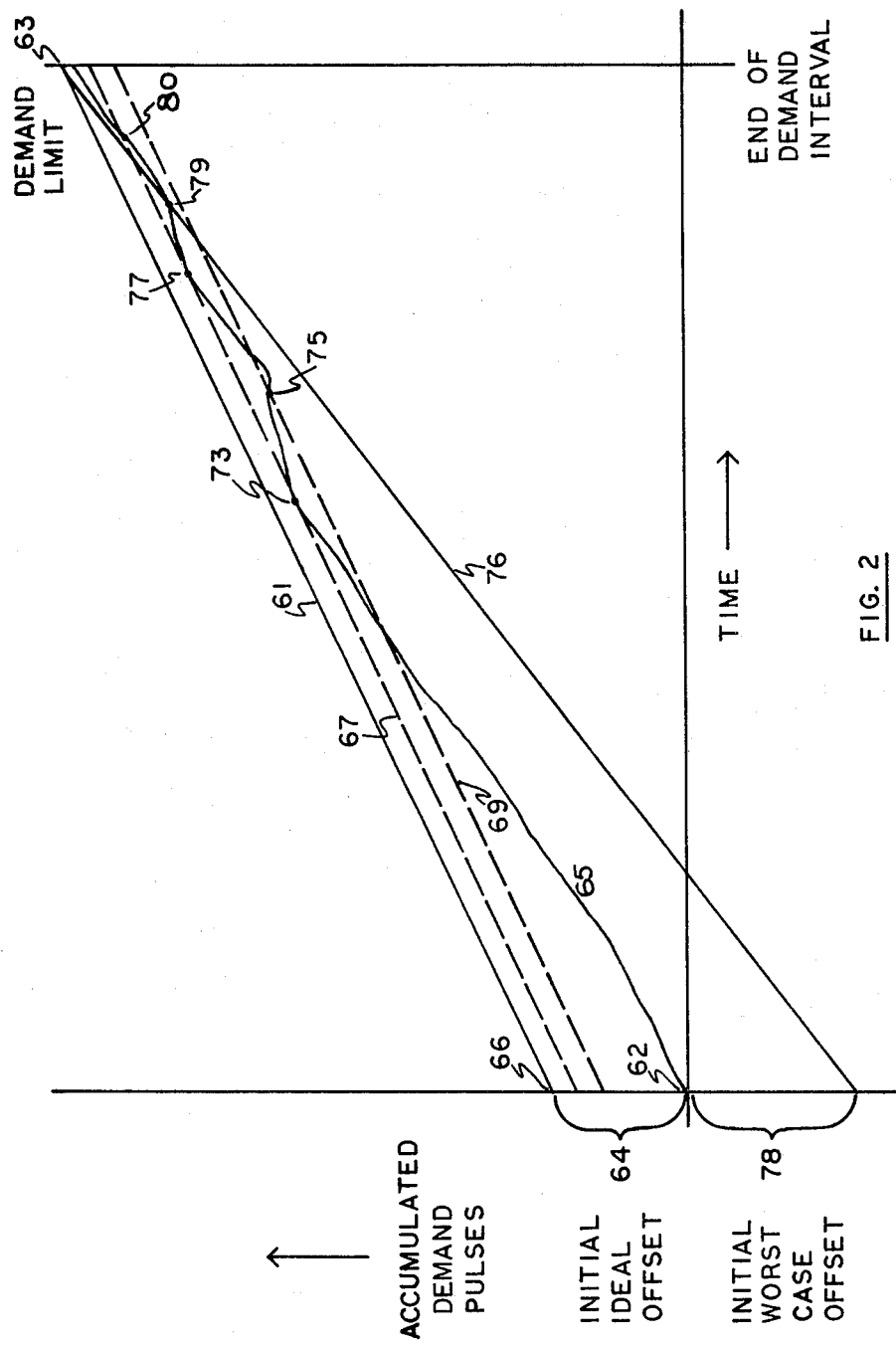
FIGURE 2 illustrates the operation of the power demand system in graphical form.

Referring now to FIGURE 2, for an illustration of the emand limit system in a graphical manner the horizontal ne represents the time from the start to the end of demand interval, (e.g., 30 minutes) and the vertical line epresents the increase in accumulated demand pulses. he demand limit is indicated by point 63 at the end of he demand interval, and at the end of the demand nterval the power used should equal as close as possible his demand limit.

The ideal rate of power use would be indicated by a traight line 61 from point 62 representing the start of the emand interval with no accumulated demand pulses, o the demand limit at point 63 at the end of the demand nterval. The actual power usage is indicated by curve 5. An offset 64 is provided by adding a predetermined umber of pulses into error counter 27 at the beginning f each demand interval so that the ideal power use curve 1 starts at point 66. This initial offset is provided so nat the actual power use may exceed the ideal use arly in the demand period without premature load hedding.

The ideal demand pulse rate is set into the ideal demand reset circuit 23 so that at the end of the demand interval he accumulated pulses as indicated at point 63 equal the sum of the initial ideal offset 64 set into the offset register 35 and the ideal demand pulse rate. For instance, assume that the demand limit is 230 accumulated pulses over the demand period. The actual power usage over the demand period as indicated by curve 65 should therefore equal 230 pulses at the end of the demand period. An initial ideal offset of 50 pulses is entered into the error counter 27 so that at the start of the demand period error counter 27 is set to 50 as indicated by the offset 64 in FIGURE 2. Therefore another 180 pulses should be uniformly generated over the demand period as indicated by ideal demand curve 61 in FIGURE 2. An ideal demand rate of 180 is then set into the ideal demand preset thumbwheel switches so that 180 uniformly spaced pulses will be applied to the positive terminal 29 of the error counter 27 and added to the 50 counts already in the error counter 27 during the demand interval as indicated by the ideal rate curve 61 in FIGURE 2.

Pulses from the utility metering source 33 are subtracted from the error counter 27 as power is used so that at any instant of time during the demand interval the contents of the error counter represents the difference beween curves 61 and 65 shown in FIGURE 2.

Shed point register thumbwheel switches 43 are set to a count of 10 and restore point register thumbwheel switches 45 are set to a count of 20. Digital camparator 39 and 41 continually compare the contents of shed point register thumbwheel switches 43 and restore point register thumbwheel switches 45 with the contents of the error counter 27. Thus, when the error counter 27 has counted to a count of 10, indicating that the difference between the actual power used (as shown by curve 65) ideal demand rate plus the initial offset (as shown by curve 61), the digital comparator 39 will verify that the contents of the shed point register thumbwheel switches 43 and error counter 27 are equal. This is indicated in the graph in FIGURE 2 at point 73. Digital comparator 39 then sets flip flop 44 to one, and flip flop 44 energizes relay coil 46 and turns on light 47.

Relay coil 46 when energized opens contacts 49 and 51 to de-energize motors 53 and 55, removing these two power users. The actual power use as indicated by curve 65 therefore drops as indicated, so that utility metering device 33 applies fewer pulses to the minimum input terminal of error counter 27, while pulses are uniformly applied to the pulse input terminal of error counter 27 in the same manner as before as indicated by the straight line curve 61 in FIGURE 2. The difference between the actual power use as indicated by curve 65 and the ideal demand rate as indicated by curve 61 increases, and this is reflected in the error counter 27. The difference between the actual and ideal increases from a count of 10, and this difference is continually compared with the contents of the restore point register thumbwheel switches 45 by digital comparator 41.

When the difference between the actual and ideal power use reaches a count of 20, digital comparator 41 determines that the contents of error counter 27 and the restore point register 45 are identical as indicated by point 75 on the graph in FIGURE 2 and resets flip flop 44 to zero. Light 47 and relay coil 46 are therefore de-energized, closing contacts 49 and 51, restoring power to motors 53 and 55.

The power use then begins to climb again as indicated by the actual power use curve 65 until at point 77 on the curve digital comparator 41 finds an identity between the contents of the error counter 27 and the shed point register thumbwheel switches 43 and sets flip flop 44 again to remove motors 53 and 55 from the power circuit.

The power usage again begins to fall as indicated by the actual power use curve 65.

The worst case reference curve 76 is provided to safely restore loads when they have been previously shed near the end of the demand interval. The worst case reference curve represents the total power which might be used if all of the power using devices are used at full power throughout the demand period. In the specific graph used this would be represented by the generation of 290 pulses. The demand limit is 230 pulses. A negative offset 78 of 60 pulses is provided by inserting a count of minus 60 pulses into the error counter 91 from the offset register 89 at the beginning of each demand period. A 290 worst case pulse rate is provided from the worst case rate preset thumbwheel switches 83 so that 290 uniformly spaced pulses are added to the positive terminal of error counter 91 over the demand interval. In this manner with the minus 60 count added into the conuter 91 at the beginning of the demand interval the counter will count 290 uniformly spaced positive pulses during the demand interval.

The actual power use pulses are subtracted from the error counter 91 during the demand period so that at any instant of time during the demand period the error counter 91 contains the difference between the worst case pulse rate as indicated by the worst case rate curve 76 and the actual power use as indicated by the actual power use curve 65. The error counter 91 goes positive when the cumulative worst case demand pulses minus the negative offset exceeds the cumulative actual demand pulses. This is shown in the graph in FIGURE 2 at point 79 where the worst case demand pulse rate curve 76 intersects the actual power use curve 65. When the error counter 91 goes positive, it applies a signal to flip flop 44 to reset and keep reset flip flop 44 for the rest of the demand period. Thus, when the actual demand curve 65 again intersects the shed point curve 67 at point 80 flip flop 44 cannot be set and no loads will be shed.

The inhibition of any further shedding of loads when the actual power use curve 65 intersects the worst case demand curve 76 is possible because at this point it is known that even with all loads using full power, the power use will not exceed the worst case demand curve 73.

In summary a new and improved demand control system has been described. The power consumed may be limited during the demand interval to a predetermined maximum demand level.

Figure 3A:
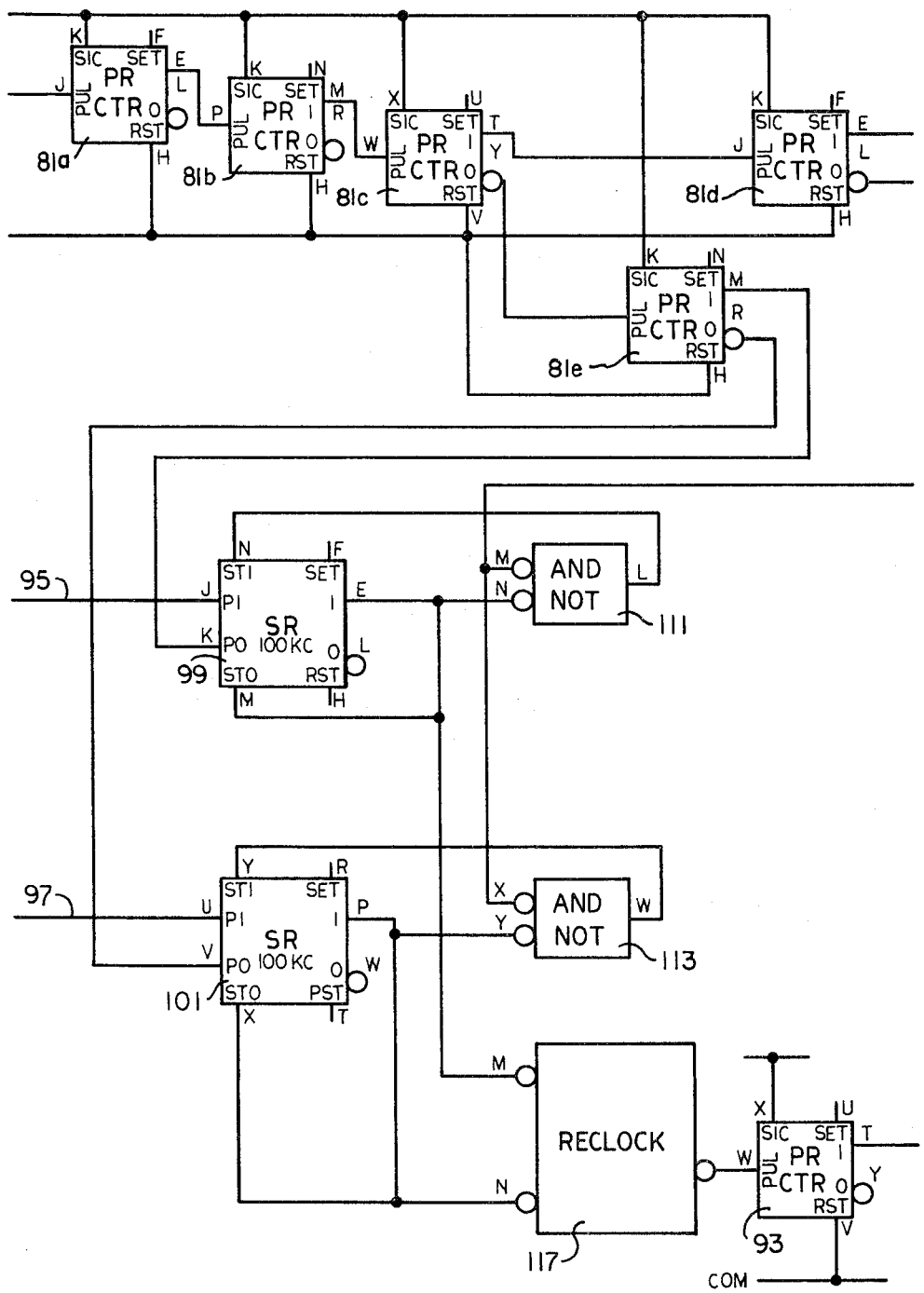
FIGURES 3A and 3B show the anti-coincidence circuitry.
Figure 3B:
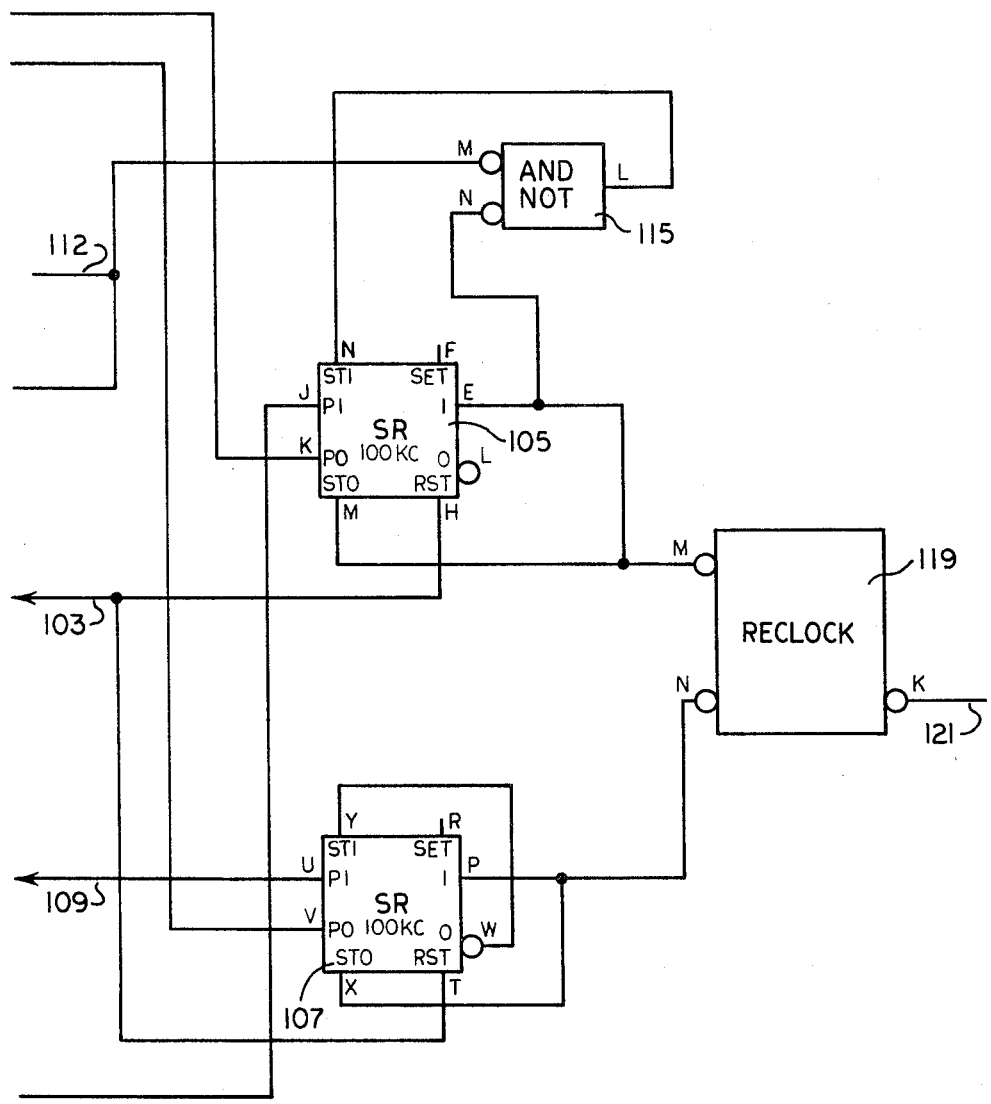

In FIGURE 3 programmable counters 81a, 81b, 81c, 81d and 93 are counters which change states on the application of a positive pulse or a positive going signal applied to the pulse or PUL input terminals. A one or negative signal applied to the SIC or steer inhibit count input terminals inhibits the operation of the counter in response to a pulse input to the PUL input terminal. A negative signal applied to the reset or RST input terminal resets the programmable counter to a binary zero state. When the programmable counter is in the binary one state, it produces a one or negative signal from its one output terminal and a zero signal from its zero output terminal. When it is in a binary zero state, it produces a one or negative signal from its zero output terminal and a zero signal from its one output terminal.

Programmable counters 81a through 81c are connected together as shown in a straight binary counter counting from a binary one to a binary eight. The steer inhibit count terminals are connected to a common zero signal and the reset terminals of programmable counter bits 81a and 81b are also connected to a zero signal. In this manner programmable counter bits 81a through 81c count from a binary one to a binary seven and on the eighth pulse return to all zeroes.

Shift register bits 99, 101, 105, and 107 are shift register bits with two pulse input terminals P1 and P0, steer 1 and steer 0 terminals, a set terminal, a reset terminal and a binary one and a binary zero output terminals. A one signal applied to the reset terminal will reset that shift register bit to zero and a one signal applied to set terminal will set that shift register bit to one. A shift register bit set to one will produce a one signal on its binary one output terminal and a zero signal on its binary zero output terminal. A shift register bit reset to zero will produce a zero signal on its binary one output terminal and a one signal on its binary zero output signal. A positive pulse or positive going signal applied to the P1 input pulse terminal at the same time a one signal is applied to the steer 1 terminal and a zero signal is applied to the steer 0 terminal will cause the shift register bit to change state to a binary one state. In the same manner a positive signal or a positive going signal applied to the P0 input terminal at the same time that a one signal is applied to the steer 0 terminal and a zero signal is applied to the steer 1 terminal will cause the shift register to change to a binary zero state.

The outputs from the utility metering device 33 shown in FIGURE 1 are applied to input terminals 95 and 97 which are in turn applied to the P1 input terminals of shift register bits 99 and 101, respectively. The reference pulses from the scaling circuit 25 in FIGURE 1 are applied to the reference input terminal 101 and applied to P1 input pulse terminal of shift register bit 107.

AND/NOT circuits 111, 113, and 115 are standard AND/NOT circuits which operate in such a manner that a zero signal applied to both input terminals causes a one output signal to be produced on the output terminal. A one signal applied to one or more of the input signals causes a zero signal to be produced on the output terminal.

Reclock circuits 117 and 119 are circuits described in copending application S.N. 359,603, filed Apr. 14, 1964, by Robert C. Clark, and assigned to the assignee of the present application. This reclock circuit may receive signals on either input terminal at the same time but produces an output signal which discriminates between the input signals. In this manner if an input signal is received on both terminals at the same time, both of them will be produced on the output terminal, one delayed from the other.

An input from the 60 cycle per second pulse generator is applied to the pulse input terminal of the first programmable counter 81a of the counters 81a–81c. The counters 81a–81c count in a binary fashion to divide the 60 cycle per second pulses by eight. The output from the one output terminal of programmable counter 81c is applied to the pulse input of programmable counter bit 81a and the output from zero output terminal programmable counter 81c is applied to the pulse input terminal of programmable counter 81e. Programmable counter 81e controls the resetting of shift register bits 99 and 101 to zero by applying alternately the one and zero output terminals of programmable counter bit 81e to the pulse 0 input terminals of shift register bits 99 and 101 so that shift register bits 99 and 101 will be steered back to zero after they have been steered to one. Shift register bits 99 and 101 are steered to zero so that they produce on their one output terminal a zero signal which is applied to one input of AND/NOT's 111 and 113 respectively A zero signal is normally received on input terminal 112 and applied to the other terminals of AND/NOT's 111 and 113 so AND/NOT's 111 and 113 thereby both produce a one signal which is applied to the steer 1 input terminals of shift register bits 99 and 101 respectively Positive pulses applied to the pulse 1 terminals of shift register bits 99 or 101 steer those shift register bits to one. Shift register bits 99 or 101 thereby apply one signal to terminals M and N of reclock circuit 117. Reclock circuit 117 provides for anti-coincidence thereby producing a signal and applying that signal to the pulse input terminal of programmable counter bit 93. Programmable counter bit 93 has a signal applied to the SIC terminal thereof so it will, of course, be set to one producing a one signal from its output terminal and applying it to the pulse 1 terminal of shift register bit 105 Shift register bit 105 will be steered to a binary one in the same manner as previously described for shift register bits 99 and 101 and produce a one signal which is applied to terminal M of reclock circuit 119. A reference pulse received on input terminal 109 will be applied to the pulse one terminal of shift register bit 107 to steer that shift register bit to one. Shift register bit 107 applies a one signal to terminal N of reclock circuit 119 at some time. Reclock circuit 119 provides that if there is coincidence of pulses no pulse will be lost so that reclock circuit 119 produces an output on terminal 121 which is applied to reversing error counter 27 in FIGURE 1.

This anti-coincidence circuitry may be duplicated for the worst case pulse rate as well as the ideal pulse rate so that there will be no lost pulse.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In an electrical load limiting system for controlling the power to a load limit during a demand period, means for producing a succession of electrical pulses at a substantially constant rate to indicate an ideal use of power during said demand period, means for producing a succession of electrical pulses at a substantially constant rate to indicate the maximum possible use of power during said demand period, means for producing a succession of electrical pulses at an instantaneous rate proportional to the rate of actual power use during said demand period, means for detecting any departure from a predetermined relationship between the rate of production of said ideal rate pulses and said actual rate pulses and for producing an output indicative of the departure from said predetermined relationship, means controlled by the output of said detecting means for changing the actual power use to restore said predetermined relationship to remain within the load limit, and means for detecting any departure from a predetermined relationship between the rate of production of said actual rate pulses and said maximum rate pulses for inhibiting said control means.

2. In an electrical load limiting system for controlling the power to a load limit during a demand period, means for producing a succession of electrical pulses at a substantially constant rate to indicate an ideal use of power during said demand period, means for producing a succession of electrical pulses at a substantially constant rate to indicate the maximum possible use of power during said demand period, means for producing a succession of electrical pulses at an instantaneous rate proportional to the rate of actual power use during said demand period, a first reversing counter responsive to said ideal rate pulses and said actual rate pulses for indicating the difference between said actual pulse rate and said ideal pulse rate, means responsive to said reversing counter when the difference between said actual pulse rate and said ideal pulse rate departs from a predetermined relationship for restoring said predetermined relationship by controlling actual power use, and a second reversing counter responsive to said maximum pulse rate and said actual rate pulses for inhibiting said control means when said actual pulse rate reaches a predetermined relationship with said maximum pulse rate.

3. In an electrical load limiting system for controlling the power to a load limit during a demand period, a pulse source for producing a succession of electrical pulses at a substantially constant rate, rate multiplying means for modifying the rate of production of said pulses from said pulse source to indicate an ideal use of power during said demand period, rate multiplying means for modifying the rate of production of said pulses from said pulse source to indicate the maximum possible use of power during said demand period, means for producing a succession of electrical pulses at an instantaneous rate proportional to the rate of actual power use during said demand period, a first reversing counter responsive to said ideal rate pulses and said actual rate pulses for indicating the difference between said actual pulse rate and said ideal pulse rate, means responsive to said reversing counter when the difference between said actual pulse rate and said ideal pulse rate departs from a predetermined relationship for restoring said predetermined relationship by controlling actual power use, and a second reversing counter responsive to said maximum pulse rate and said actual rate pulses for inhibiting said control means when said actual pulse rate reaches a predetermined relationship with said maximum pulse rate.

References Cited

UNITED STATES PATENTS 3,296,452  1/1967  Williams _____ 307—35 X

ORIS L. RADER, *Primary Examiner.*

W. E. DUNCANSON, *Assistant Examiner.*